United States Patent
Sampietro et al.

[19]

[11] Patent Number: 6,157,116
[45] Date of Patent: *Dec. 5, 2000

[54] ACTIVE NOISE CANCELLATION IN DISC DRIVES

[75] Inventors: Joseph M. Sampietro, Tarzana; Muhammad A. Hawwa, Simi Valley; Khosrow Mohajerani, Newbury Park; Anoush M. Fard, Agoura Hills; Jeffrey G. Barina, Somis, all of Calif.

[73] Assignee: Seagate Technology LLC, Scotts Valley, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/014,649

[22] Filed: Jan. 28, 1998

Related U.S. Application Data

[60] Provisional application No. 60/036,981, Jan. 29, 1997.

[51] Int. Cl.⁷ .................................................. H01L 41/04
[52] U.S. Cl. ............................................................ 310/334
[58] Field of Search .......................... 381/71.7; 310/328, 310/334

[56] References Cited

U.S. PATENT DOCUMENTS

| | | | |
|---|---|---|---|
| 5,668,744 | 9/1997 | Varadan et al. | 364/528.15 |
| 5,692,053 | 11/1997 | Fuller et al. | 381/71.3 |
| 5,786,735 | 7/1998 | Su | 331/158 |
| 5,828,768 | 10/1998 | Eatwell et al. | 381/333 |

*Primary Examiner*—Nestor Ramirez
*Assistant Examiner*—Peter Medley
*Attorney, Agent, or Firm*—Jonathan E. Olson; Shawn B. Dempster; Edward P. Heller, III

[57] ABSTRACT

Noise effects in a disc drive having a disc on a rotating spindle in a housing are reduced by inducing vibrations in the housing of the disc drive that at least partially cancel a characteristic acoustic noise signal of the drive.

7 Claims, 2 Drawing Sheets

ACTIVE NOISE CANCELLATION IN DISC DRIVES

CROSS-REFERENCE TO RELATED APPLICATIONS

This application claims priority from Provisional Application No. 60/036,981 entitled "Active Noise Cancellation In Disk Drives Using Piezoelectric Devices" filed Jan. 29, 1997 by J. Sampietro, M. Hawwa, K. Mohajerani, A. Fard and J. Barina.

BACKGROUND OF THE INVENTION

The present invention relates to noise cancellation in disc drives, and more particularly to an active noise cancellation device mounted to a disc drive case operated to cancel or reduce noise in the disc drive.

High performance disc drives are being developed to accommodate increasingly higher frequencies of data recording, resulting in higher rotational speeds (e.g. 10,000 revolutions per minute) of the disc and the spindle. High spindle speed introduces or magnifies problems in the environmental dynamics of the disc drive, creating acoustic noise-producing vibrations. Moreover, the higher air velocity in the disc drive creates oscillations, cavitations and vortexes around components of the drive, contributing to the noise generated in the drive. In addition, noise is generated by the disc drive actuation system during seek operations. All of this noise is undesirable due to its negative effect on both the performance accuracy and user appreciation of the disc drive.

Passive damping techniques are commonly used to reduce high frequency noise in disc drives. Examples of passive damping include a resilient frame or shock mounts, noise-absorbing insulation, and the like. However, the noise-producing vibrations caused by increased spindle rotation speed and actuator seek operations are low frequency signals, often having a frequency as low as audible noise, and the passive damping techniques are not altogether effective in damping low frequency acoustic noise signals. Accordingly, additional noise reduction and cancellation techniques are required to effectively contain or cancel these low frequency noise components.

SUMMARY OF THE INVENTION

The present invention is a low noise, high performance disc drive including a housing, a disc on a rotating spindle in the housing, and an actuation system in the housing supporting a transducing head. At least one active noise cancellation device is mounted on the housing. Electronic driving circuitry is provided for producing vibrations in the at least one noise cancellation device, the vibrations having an amplitude, frequency and phase selected to reduce noise effects in the disc drive.

A further aspect of the invention is a method of reducing noise effects in a disc drive having a disc on a rotating spindle in a housing. Amplitude, frequency and phase attributes of a characteristic acoustic noise signal of the disc drive are determined. Vibrations are induced in the housing of the disc drive that at least partially cancel the characteristic noise signal of the disc drive.

DETAILED DESCRIPTION OF THE PREFERRED EMBODIMENTS

Figure 1:
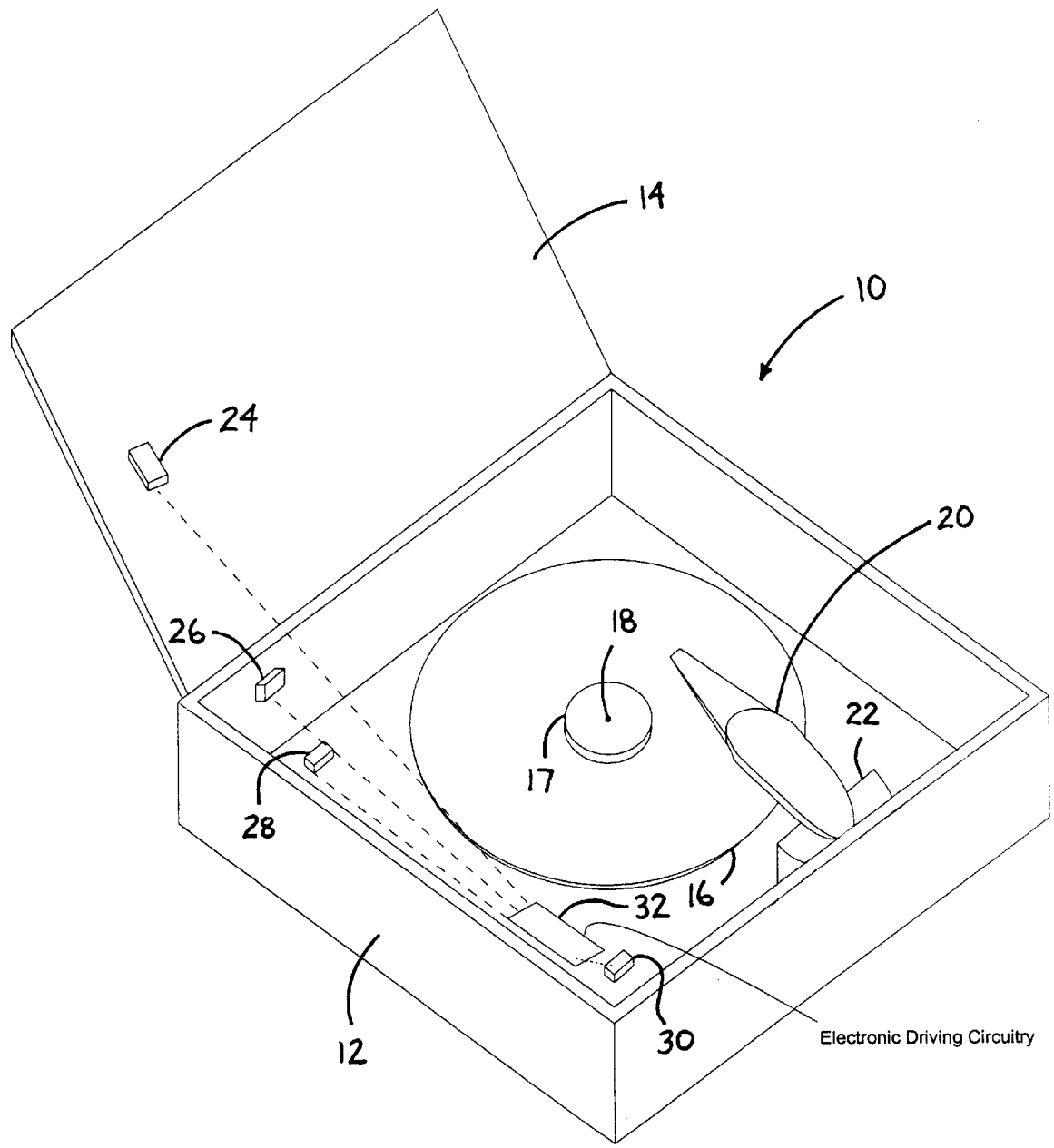
FIG. 1 is a perspective view of a disc drive system including active noise reduction devices according to the present invention.

FIG. 1 is a perspective view of disc drive system 10, implementing active noise reduction devices according to the present invention. The components of disc drive system 10 are contained within base housing 12 and top cover 14. While top cover 14 is shown as open in FIG. 1 to allow viewing of the internal components of disc drive system 10, top cover 14 typically permanently encloses the internal components of disc drive system 10. Also, while a considerable amount of "empty" volume is depicted within housing 12, the components of disc drive system 10 typically fill nearly the entire volume of housing 12, as is known in the art. Magnetic disc 16 is mounted on spindle 17, which rotates around axis 18. Actuator arm assembly 20 suspends a transducing head over the head of disc 16, and its radial position with respect to disc 16 is controlled by voice coil actuator motor 22.

Because the transducing head is able to accommodate increasingly high frequencies of data, disc 16 and spindle 17 rotate at high speeds, creating acoustic noise-producing vibrations in disc drive system 10. Operation of actuator arm assembly 20 also induces noise-producing vibrations in the drive. The vibrations hinder precision in positioning of the transducing head on actuator arm assembly 20 over a narrow track of disc 16, and may also produce audible noise that could adversely affect the performance and appreciation of the disc drive.

The effects of noise in disc drive system 10 are reduced by mounting one or more low frequency oscillating devices 24, 26, 28 and 30 to the housing portion of disc drive system 10. In a preferred embodiment, oscillating devices 24, 26, 28 and 30 are piezoelectric devices configured to mechanically oscillate in response to an applied voltage. It will be apparent to one skilled in the art that other small-scale oscillating devices may optionally be used. The configuration of FIG. 1 shows piezoelectric device 24 mounted to top cover 14, piezoelectric device 26 mounted to a side wall of base housing 12, and piezoelectric devices 28 and 30 mounted to the floor of base housing 12. These mounting locations are exemplary, and other locations on housing 12 and top cover 14, or elsewhere in disc drive system 10, are contemplated by the present invention. Because disc drives of a particular model typically exhibit a single dominant noise frequency signal, known as the "pure tone," only a single piezoelectric device is ordinarily required.

Electronic driving circuitry 32 is also preferably mounted on base housing 12 or top cover 14, to deliver a driving signal to piezoelectric device 24, 26, 28 or 30. The driving signal operates the piezoelectric devices at a frequency that is the same or nearly equal to the dominant vibrating noise frequency of disc drive system 10, and preferably 180° out of phase with the pure tone noise frequency. Thus, low frequency noise produced by the drive components destructively interacts with the out-of-phase low frequency signal generated by piezoelectric devices 24, 26, 28 and 30. Hence, devices 24, 26, 28 and 30 provide anti-noise sources that are out of phase with the noise of the spindle and the drive components, thereby providing a dynamic noise cancellation technique.

Figure 2:
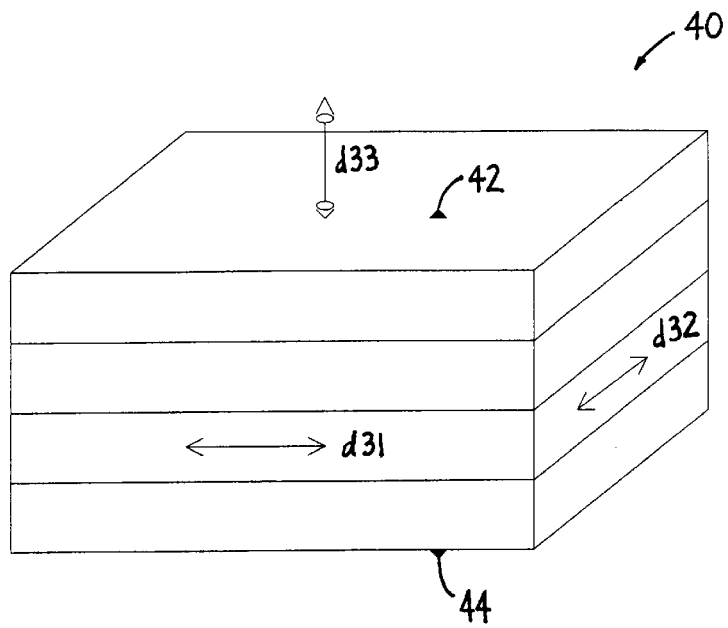
FIG. 2 is an enlarged perspective view of a stacked piezoelectric element for use as a noise reduction device in the present invention.

FIG. 2 shows a stacked piezoelectric element 40 for use with the present invention. While piezoelectric element 40 is shown as having four stacked layers, it may have more or less layers, or may include only a single layer, depending on the desired characteristics of the noise-canceling signal to be generated by piezoelectric element 40. Piezoelectric element 40 has a d31, d32, and d33 dimension associated therewith. A voltage between terminals 42 and 44 results in an expansion or contraction of piezoelectric element 40 in the d33 direction, with a corresponding expansion or contraction in the d31 direction. Therefore, a rapidly changing voltage between terminals 42 and 44 effectively causes piezoelectric element 40 to vibrate, due to expansions and contractions in the d33 and d31 directions in rapid succession. Thus, the surface to which piezoelectric element 40 is mounted vibrates, producing a secondary noise field. The frequency of vibration is controlled by the frequency of the voltage applied to terminals 42 and 44. It will be understood by one skilled in the art that other terminal and poling configurations may be used to cause expansion and contraction of piezoelectric element 40 in different dimensions of the element.

In a preferred design of the invention, the disc drive system is first tested to identify the dominant frequency, amplitude and phase of acoustic noise in the particular disc drive model. Piezoelectric devices and associated electronic driving circuitry are then specifically designed to cancel the dominant noise frequency for the particular disc drive model. Since all disc drives manufactured to a single design typically exhibit the same noise frequency spectrum, the piezoelectric devices and driving circuitry are able to be produced in volume for the particular drive model.

Figure 3:
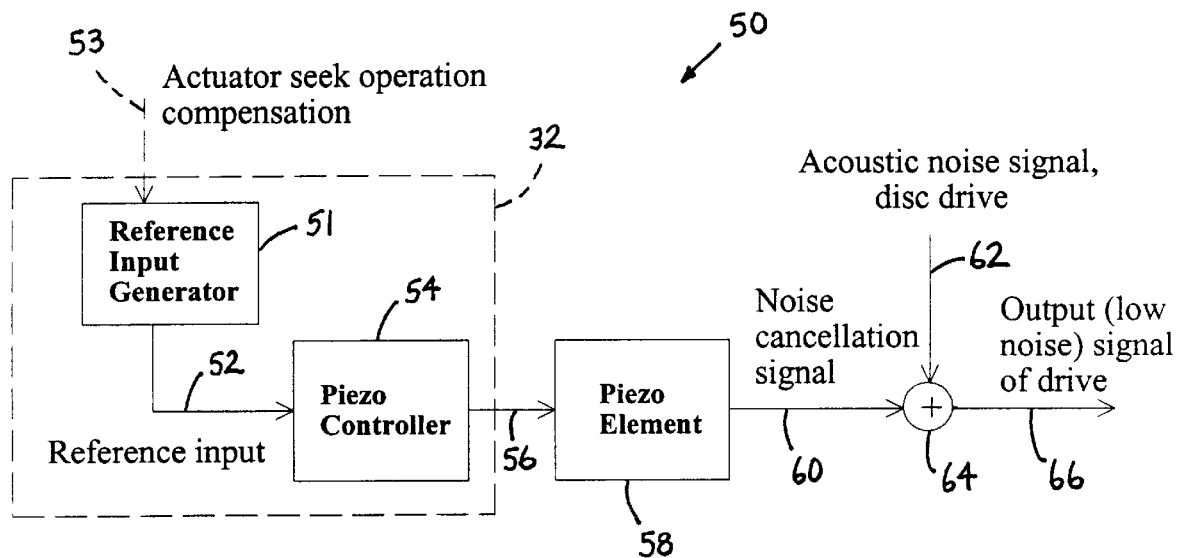
FIG. 3 is a block diagram of a noise reduction control system according to the present invention.

FIG. 3 is a block diagram of noise reduction control system 50 according to the present invention. A reference input signal is ascertained by empirical testing of the disc drive in which control system 50 is used, thereby determining amplitude, frequency and phase attributes of the characteristic acoustic pure tone noise signal associated with the disc drive due to phenomena such as spindle rotation. A standard circuit configured as a reference input signal generator 51 may be provided to generate the reference input signal based on the pure tone noise characteristics, and the reference input signal is provided on line 52 to controller 54. Reference input signal generator 51 and controller 54 together comprise electronic driving circuitry 32 for oscillating a piezoelectric element. Reference input signal generator 51 may additionally or alternatively receive an input 53 that is specifically correlated to actuator seek operation, such as by a feedback control loop monitoring use of the actuation system, so that reference input signal generator 51 generates a reference input signal that compensates for acoustic noise in the drive due to performance of a seek operation. Controller 54 generates a driving signal on line 56 based on the reference input signal on line 52, the driving signal being used to oscillate piezoelectric element 58. Piezoelectric element 58 may be any of piezoelectric elements 24, 26, 28 or 30 shown in FIG. 1. The driving signal is generated to cause oscillation of piezoelectric element 58 to create a noise cancellation signal 60 that is equal in amplitude and frequency, and opposite in phase, to the characteristic acoustic noise signal 62 of the disc drive. Thus, noise cancellation signal 60 and acoustic noise signal 62 are shown symbolically as being added together at summer 64, illustrating the mechanical cancellation of the characteristic vibrations of the drive and the induced vibrations transmitted through the piezoelectric element into the drive chassis. As a result of this cancellation effect, output signal 66 of the drive has low noise characteristics.

In an alternative embodiment, the electronic driving circuitry may itself include circuitry for dynamically testing the noise frequency characteristics of the disc drive system, and for generating a driving signal to oscillate the piezoelectric device based on the detected noise frequency of the drive. Little or no modifications to the piezoelectric device itself are necessary to implement this alternative design.

Although the present invention has been described with reference to preferred embodiments, workers skilled in the art will recognize that changes may be made in form and detail without departing from the spirit and scope of the invention.

What is claimed is:

1. A low noise, high performance disc drive comprising:
   a disc on a rotating spindle in a housing; and
   means for inducing vibrations in the housing based on a predetermined characteristic acoustic pure tone noise signal of the disc drive to reduce noise effects in the disc drive, the means acting as a open loop system, wherein the vibrations induced are independent from variations in acoustic noise signals dynamically experienced by the disc drive.

2. A low noise, high performance disc drive comprising:
   a housing;
   a disc on a rotating spindle in the housing;
   an actuation system in the housing supporting a transducing head;
   at least one active noise cancellation device mounted on the housing, and
   electronic driving circuitry for producing vibrations in the at least one noise cancellation device, the vibrations having an amplitude, frequency and phase based on a predetermined characteristic acoustic pure tone noise signal of the disc drive to reduce noise effects in the disc drive independent from variations in acoustic noise signals experienced by the disc drive.

3. The disc drive of claim 2, wherein the at least one active noise cancellation device comprises a piezoelectric element, with expansion and contraction of the piezoelectric element being controlled by a voltage supplied by the electronic driving circuitry.

4. A low noise, high performance disc drive comprising:
   a housing;
   a disc on a rotating spindle in the housing;
   an actuation system in the housing supporting a transducing head;
   at least one active noise cancellation device mounted on the housing; and
   electronic driving circuitry for producing a first vibrational pattern in the at least one noise cancellation device, the first vibrational pattern having an amplitude, frequency and phase based on a predetermined characteristic acoustic pure tone noise signal of the disc drive to reduce noise effects in the disc drive independent from variations in acoustic noise signals experienced by the disc drive; and
   wherein the electronic driving circuitry produces a second vibrational pattern that is initiated based on an input indicating the disc drive is performing an actuator seek operation, the second vibrational pattern serving to compensate for noise induced during actuator seek operation.

5. A method of reducing noise effects in a disc drive belonging to a series of disc drives, each disc drive in the series being manufactured from identical components including a disc on a rotating spindle in a housing, the method comprising:

determining a characteristic noise signal common to the series of disc drives, the noise signal having particular amplitude, frequency and phase attributes generating a reference signal to control an active noise cancellation device to induce a first vibration pattern in the housing of the disc drive that at least partially cancels the characteristic noise signal of the disc drive, independent from variations in acoustic noise signals experienced by the drive.

6. The method of claim 5, further comprising:

determining a characteristic noise signal common to the series of disc drives when a seek operation is performed;

determining whether the disc drive is performing a seek operation, and upon determining that the disc drive is performing a seek operation, generating another reference signal to control the active noise cancellation device to induce a second vibration pattern in the housing of the disc drive that at least partially cancels the characteristic noise signal of the disc drive combined with a noise characteristic associated with the seek operation performed by the disc drive.

7. The method of claim 5, wherein the at least one active noise cancellation device comprises a piezoelectric element, with expansion and contraction of the piezoelectric element being controlled by a voltage supplied thereto.

* * * * *